United States Patent
Armacanqui et al.

(10) Patent No.: US 11,757,088 B2
(45) Date of Patent: *Sep. 12, 2023

(54) ALKALINE ELECTROCHEMICAL CELL WITH IMPROVED ANODE AND SEPARATOR COMPONENTS

(71) Applicant: Energizer Brands, LLC, St. Louis, MO (US)

(72) Inventors: M. Edgar Armacanqui, Madison, WI (US); Andrew J. Roszkowski, Waunakee, WI (US); Casey Imhoff, Middleton, WI (US); Donald Raymond Crowe, Dodgeville, WI (US); Matthew Evans, Stoughton, WI (US); John Hadley, Madison, WI (US); Matthew Hennek, Stoughton, WI (US); Tim F. Turba, Neenah, WI (US); Enqing Zhu, Verona, WI (US)

(73) Assignee: Energizer Brands, LLC, St. Louis, MO (US)

( * ) Notice: Subject to any disclaimer, the term of this patent is extended or adjusted under 35 U.S.C. 154(b) by 281 days.

This patent is subject to a terminal disclaimer.

(21) Appl. No.: 16/752,312

(22) Filed: Jan. 24, 2020

(65) Prior Publication Data

US 2020/0161637 A1 May 21, 2020

Related U.S. Application Data

(62) Division of application No. 15/626,601, filed on Jun. 19, 2017, now Pat. No. 10,693,125.

(Continued)

(51) Int. Cl.
*H01M 4/24* (2006.01)
*H01M 6/08* (2006.01)
(Continued)

(52) U.S. Cl.
CPC ............. *H01M 4/244* (2013.01); *H01M 4/42* (2013.01); *H01M 6/085* (2013.01); *H01M 10/24* (2013.01);
(Continued)

(58) Field of Classification Search
CPC ...... H01M 6/085; H01M 10/24; H01M 10/26; H01M 10/28; H01M 50/409;
(Continued)

(56) References Cited

U.S. PATENT DOCUMENTS 5,158,844 A  10/1992  Hagens et al.
5,789,102 A   8/1998  Jacus et al.
(Continued)

FOREIGN PATENT DOCUMENTS

CN   1237803 A   12/1999
CN   1557031 A   12/2004
(Continued)

OTHER PUBLICATIONS

Japan Patent Office, Search Report received for Application No. 2019-518184, dated Mar. 22, 2021, 26 pages, Japan.
(Continued)

*Primary Examiner* — Brittany L Raymond
(74) *Attorney, Agent, or Firm* — Alston & Bird LLP

(57) ABSTRACT

An alkaline electrochemical cell includes a cathode, an anode which includes an anode active material, and a non-conductive separator disposed between the cathode and the anode, wherein from about 20% to about 50% by weight of the anode active material relative to a total amount of anode active material has a particle size of less than about 75 μm, and wherein the separator includes a unitary, cylindrical configuration having an open end, a side wall, and integrally formed closed end disposed distally to the open end.

20 Claims, 10 Drawing Sheets

Related U.S. Application Data

(60) Provisional application No. 62/352,243, filed on Jun. 20, 2016.

(51) Int. Cl.

| | | |
|---|---|---|
| *H01M 50/44* | (2021.01) | |
| *H01M 50/429* | (2021.01) | |
| *H01M 50/469* | (2021.01) | |
| *H01M 4/42* | (2006.01) | |
| *H01M 10/24* | (2006.01) | |
| *H01M 10/26* | (2006.01) | |
| *H01M 10/28* | (2006.01) | |
| *H01M 4/02* | (2006.01) | |
| *H01M 50/414* | (2021.01) | |
| *H01M 50/417* | (2021.01) | |
| *H01M 50/423* | (2021.01) | |
| *H01M 50/426* | (2021.01) | |

(52) U.S. Cl.
CPC .......... *H01M 10/26* (2013.01); *H01M 10/28* (2013.01); *H01M 50/4295* (2021.01); *H01M 50/44* (2021.01); *H01M 50/469* (2021.01); *H01M 50/414* (2021.01); *H01M 50/417* (2021.01); *H01M 50/423* (2021.01); *H01M 50/426* (2021.01); *H01M 50/429* (2021.01); *H01M 2004/021* (2013.01); *H01M 2004/023* (2013.01); *H01M 2004/027* (2013.01); *H01M 2300/0014* (2013.01)

(58) Field of Classification Search
CPC .......... H01M 50/411; H01M 50/4295; H01M 50/44; H01M 50/463
See application file for complete search history.

(56) References Cited

U.S. PATENT DOCUMENTS

| | | | |
|---|---|---|---|
| 6,177,210 B1 * | 1/2001 | Lonsberry | H01M 50/403 |
| | | | 429/140 |
| 6,270,833 B1 | 8/2001 | Yamashita et al. | |
| 6,991,875 B2 * | 1/2006 | Christian | H01M 4/52 |
| | | | 429/223 |
| 7,244,529 B2 | 7/2007 | Fujiwara et al. | |
| 7,763,384 B2 | 7/2010 | Boone et al. | |
| 8,728,652 B2 | 5/2014 | Okada et al. | |
| 9,105,923 B2 | 8/2015 | Sarkas et al. | |
| 10,446,832 B2 | 10/2019 | Armacanqui et al. | |
| 10,693,125 B2 | 6/2020 | Armacanqui et al. | |
| 2002/0155352 A1 | 10/2002 | Durkot et al. | |
| 2005/0106461 A1 | 5/2005 | Moore et al. | |
| 2009/0181293 A1 | 7/2009 | Kato et al. | |
| 2010/0119930 A1 * | 5/2010 | Anglin | H01M 6/085 |
| | | | 429/144 |
| 2015/0037627 A1 | 2/2015 | Armacanqui et al. | |
| 2016/0133920 A1 | 5/2016 | Armacanqui et al. | |
| 2019/0214632 A1 | 7/2019 | Armacanqui et al. | |

FOREIGN PATENT DOCUMENTS

| | | | |
|---|---|---|---|
| CN | 1926702 A | 3/2007 | |
| CN | 105122509 A | 12/2015 | |
| JP | H04-312763 A | 11/1992 | |
| JP | 2003-151539 A | 5/2003 | |
| JP | 2006-222009 A | 8/2006 | |
| JP | 2007-115700 A | 5/2007 | |
| JP | 2010-080246 A | 4/2010 | |
| JP | 2010-118285 A | 5/2010 | |
| JP | 2014-007002 A | 1/2014 | |
| JP | 2018-506150 A | 3/2018 | |
| WO | WO 2012/049720 A1 | 4/2012 | |

OTHER PUBLICATIONS

Japan Patent Office, Office Action received for Application No. 2019-518184, dated Apr. 26, 2021, 22 pages, Japan.

China National Intellectual Property Administration, Office Action received for Application No. 201780050487.6, dated Aug. 20, 2021, 15 pages, P.R.C.

International Search Report and Written Opinion for PCT/US2017/038129, dated Sep. 26, 2017 (15 pages).

Partial Supplementary European Search Report and Provisional Opinion in European Application No. 17816003.2 dated Mar. 10, 2020.

United States Patent and Trademark Office, Office Action received for U.S. Appl. No. 16/311,643, dated Jun. 24, 2021, 23 pages, U.S.

* cited by examiner

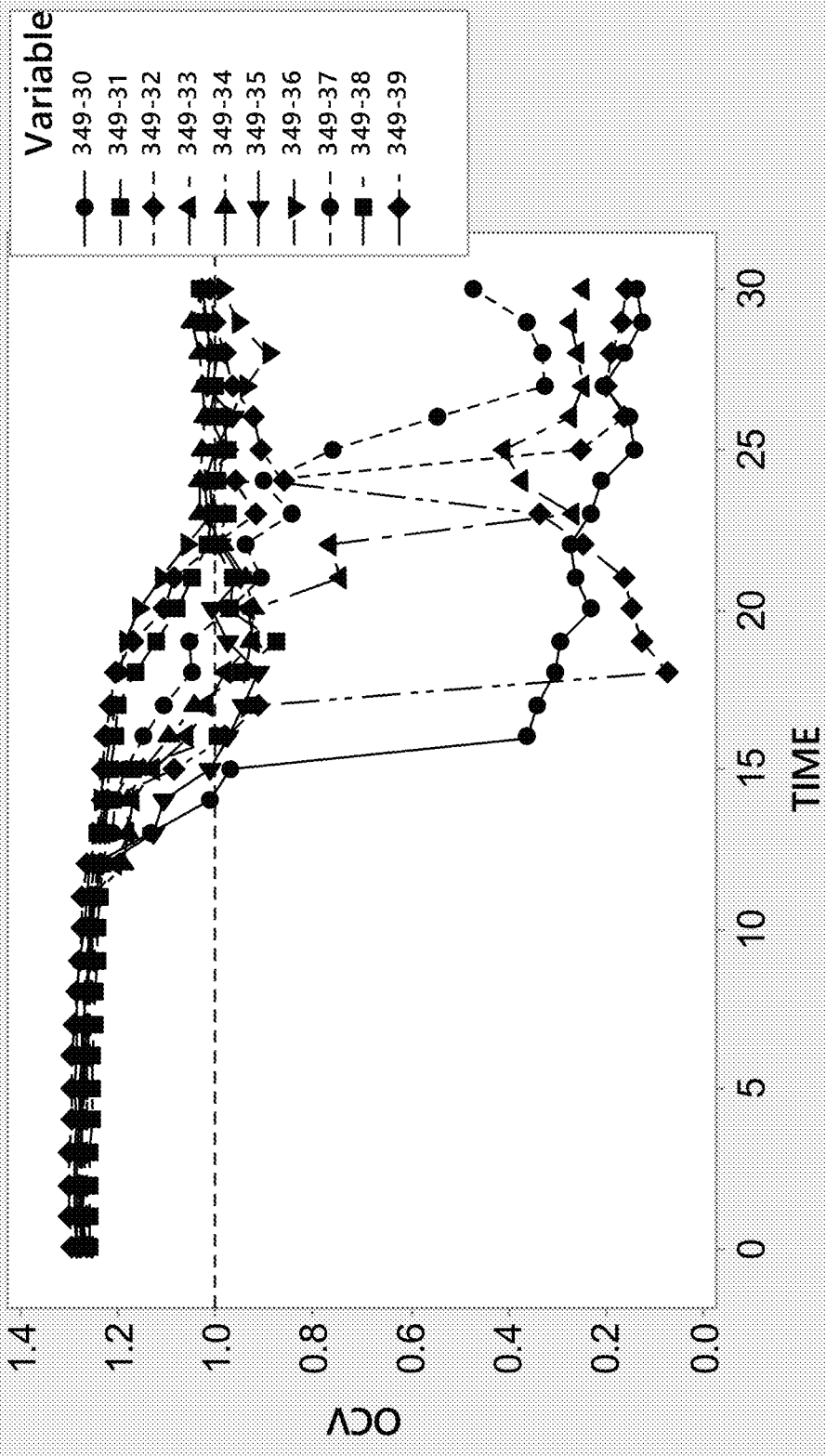

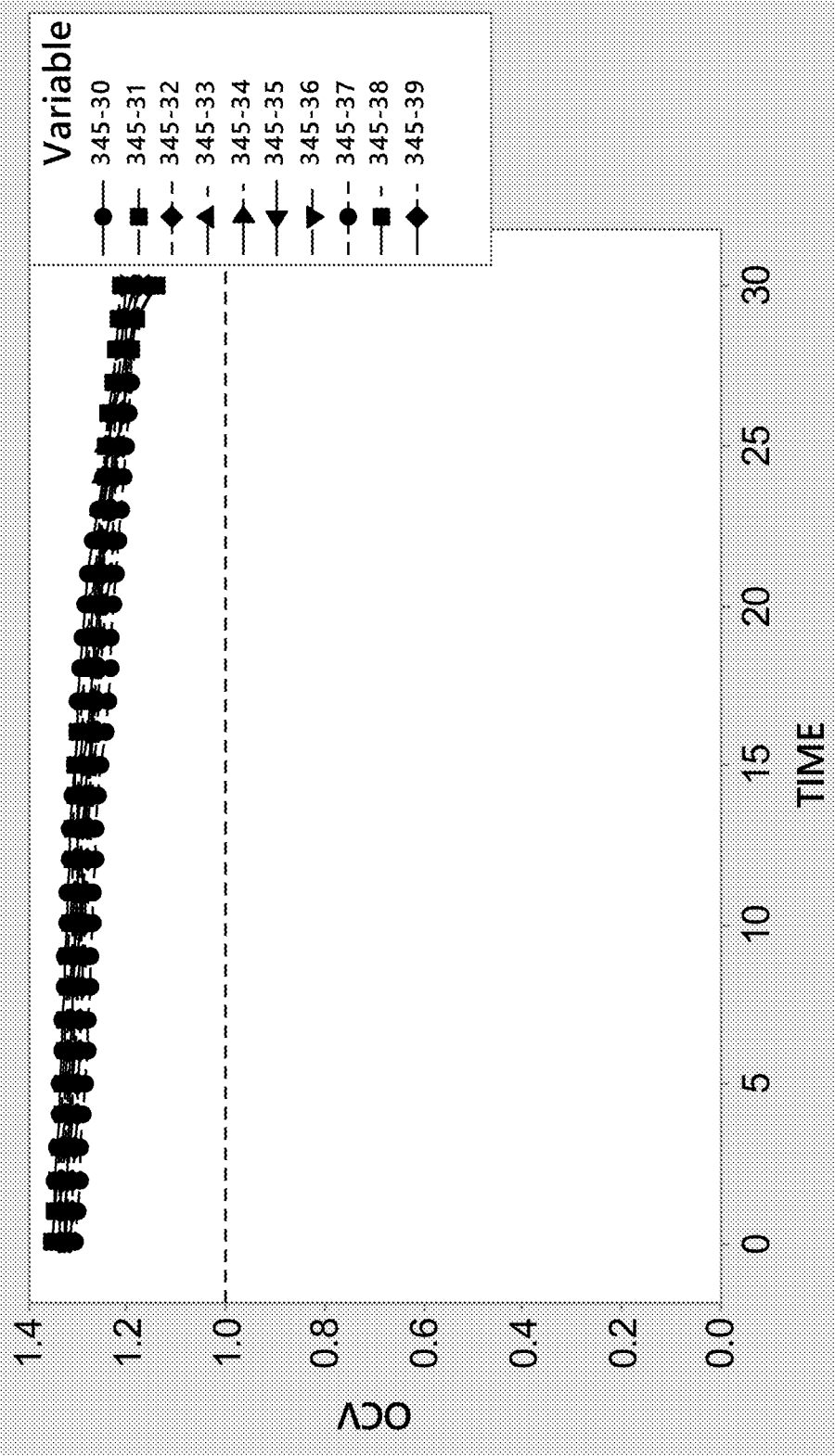

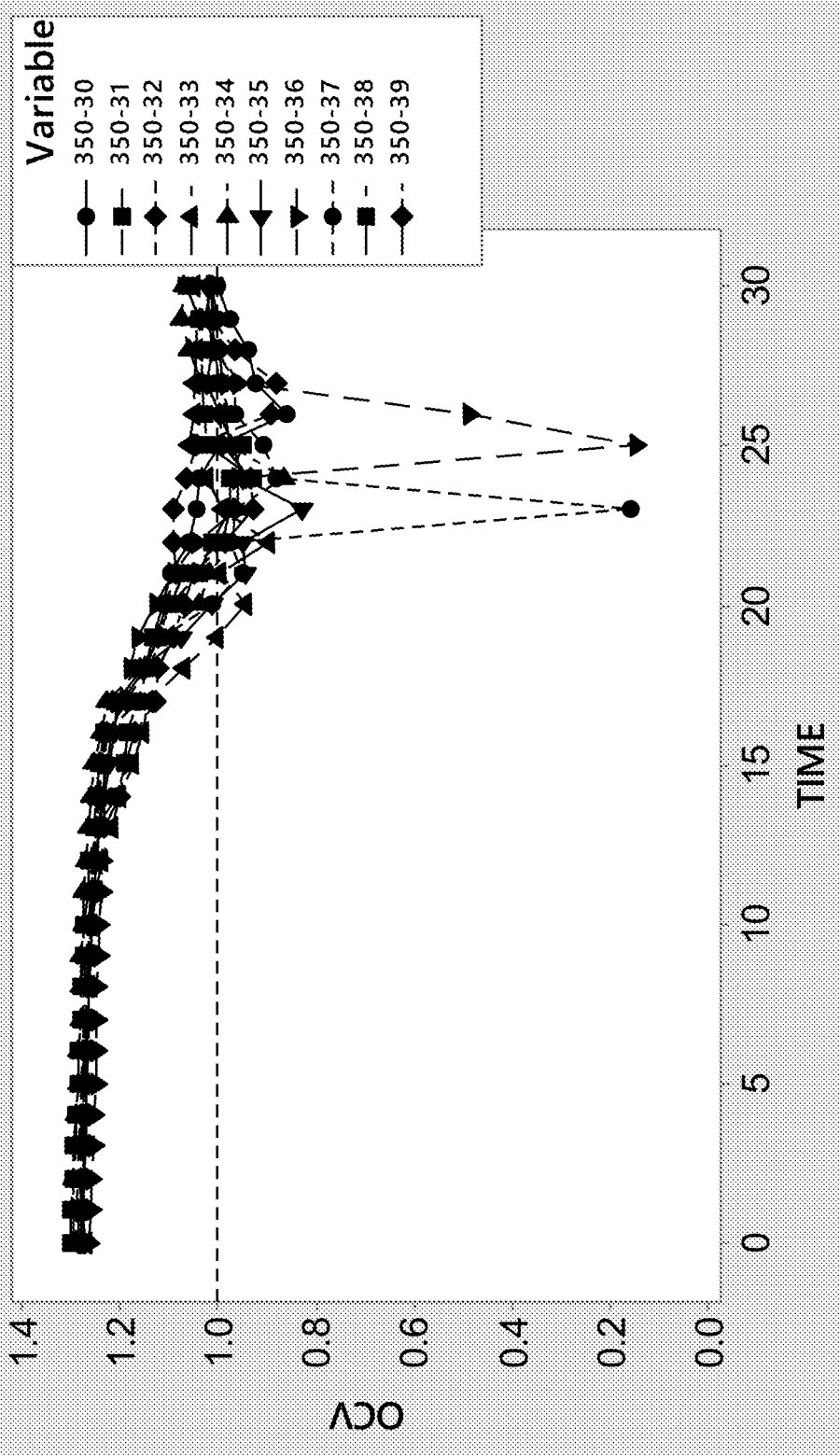

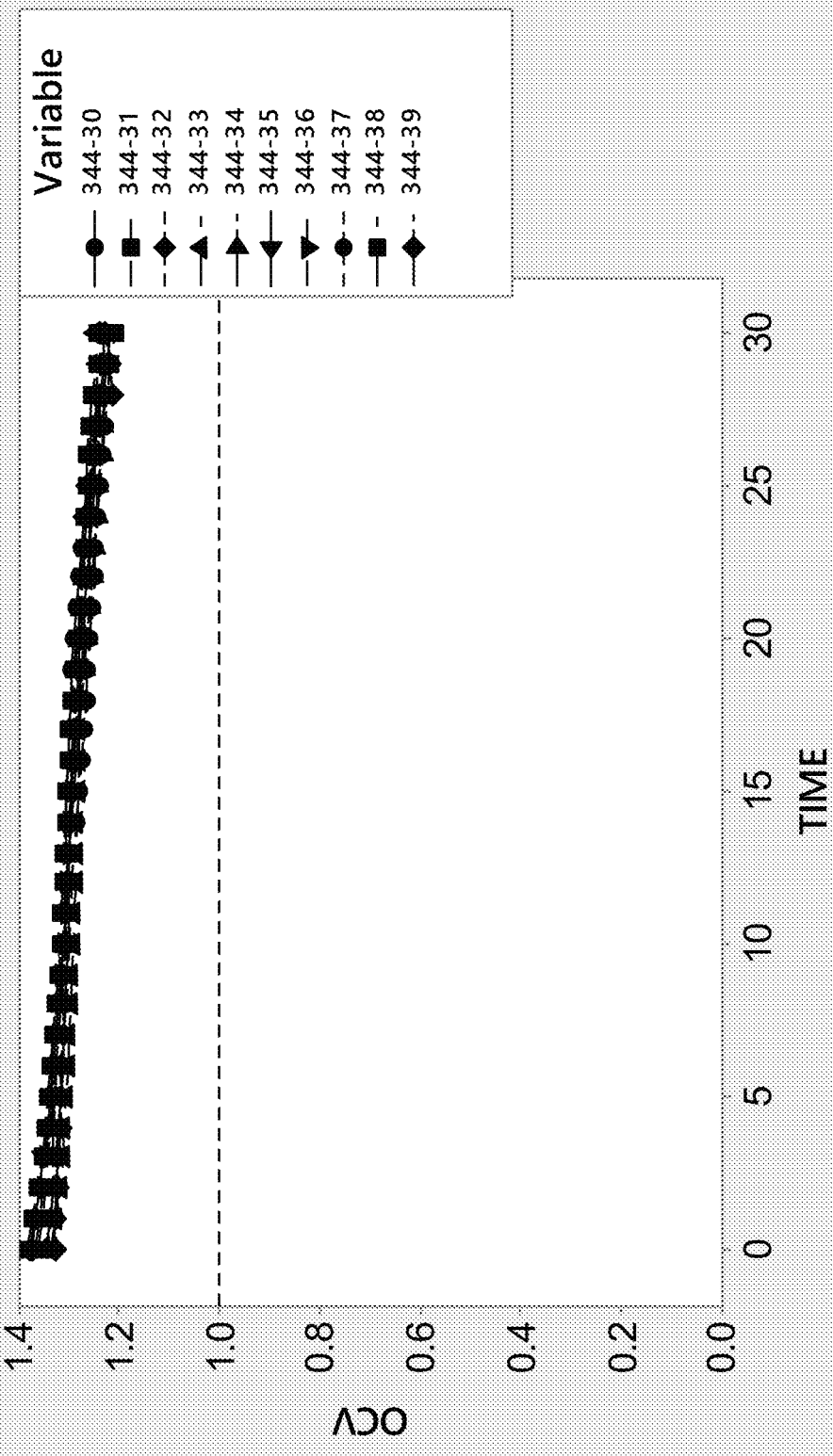

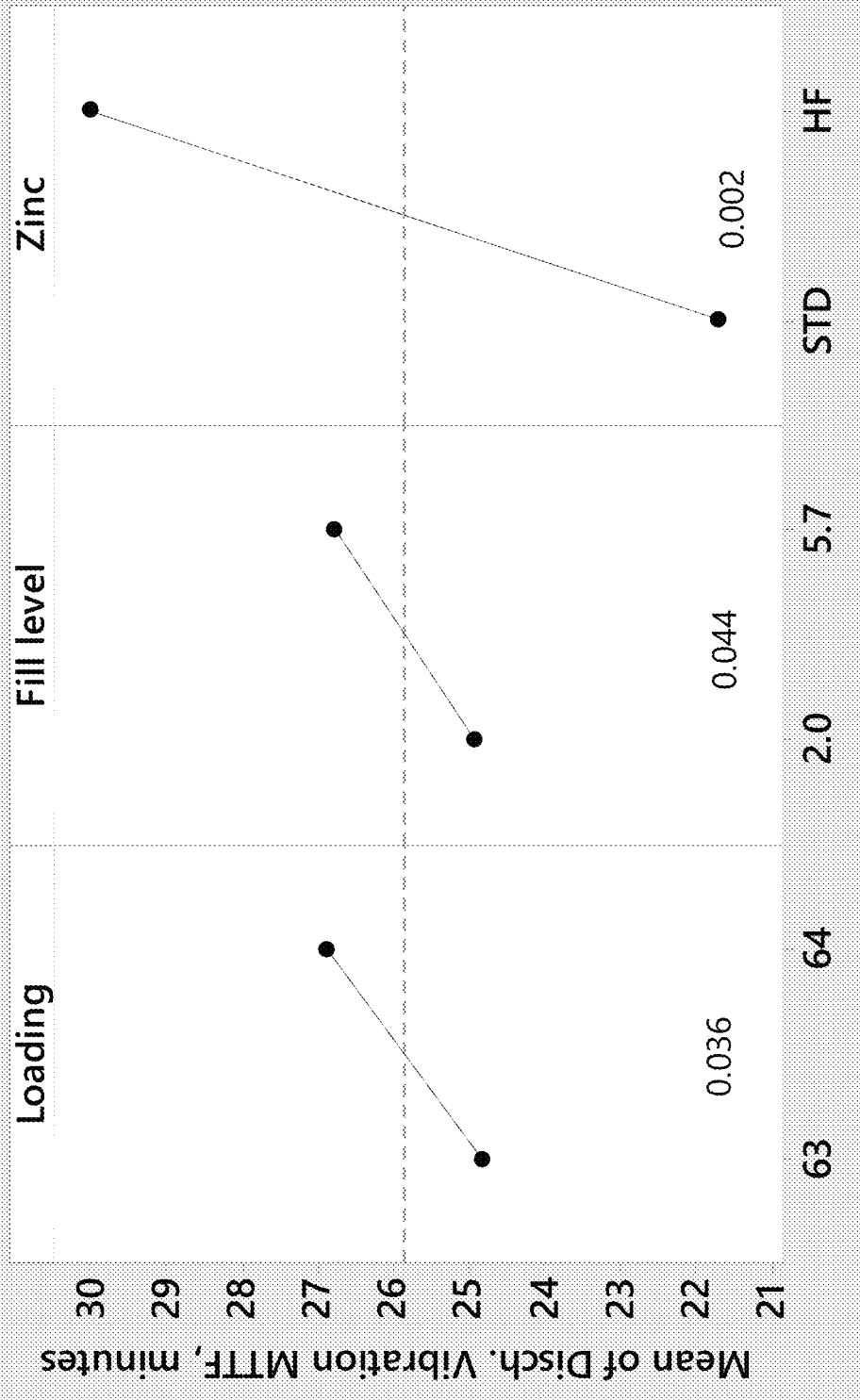
Fig. 7 Discharge Vibration time to failure of LR20 cells with STD & IBC separator.

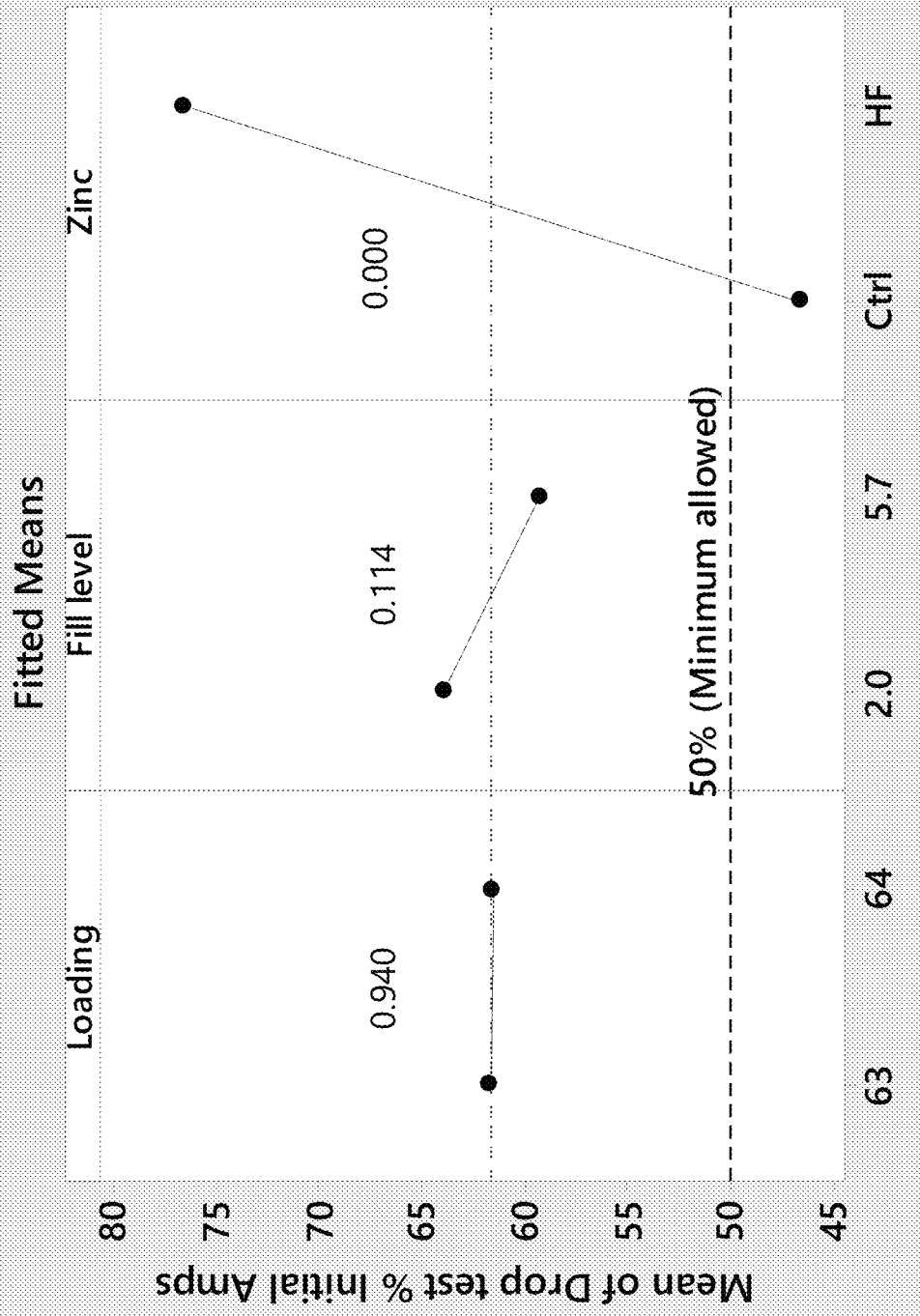

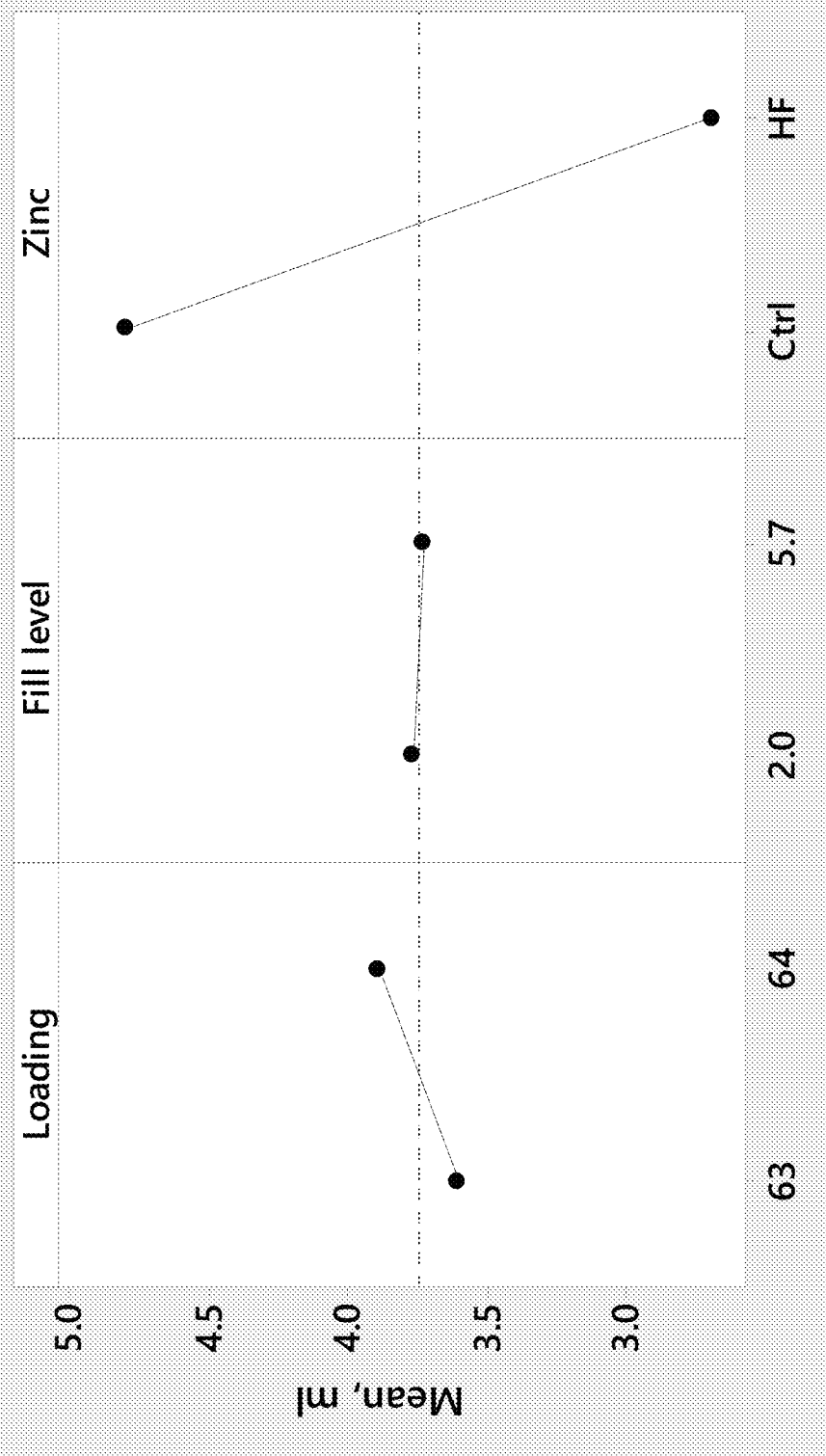
Fig. 9. Partial Discharge Cell Gassing of LR20 cells with IBC separator (ml).

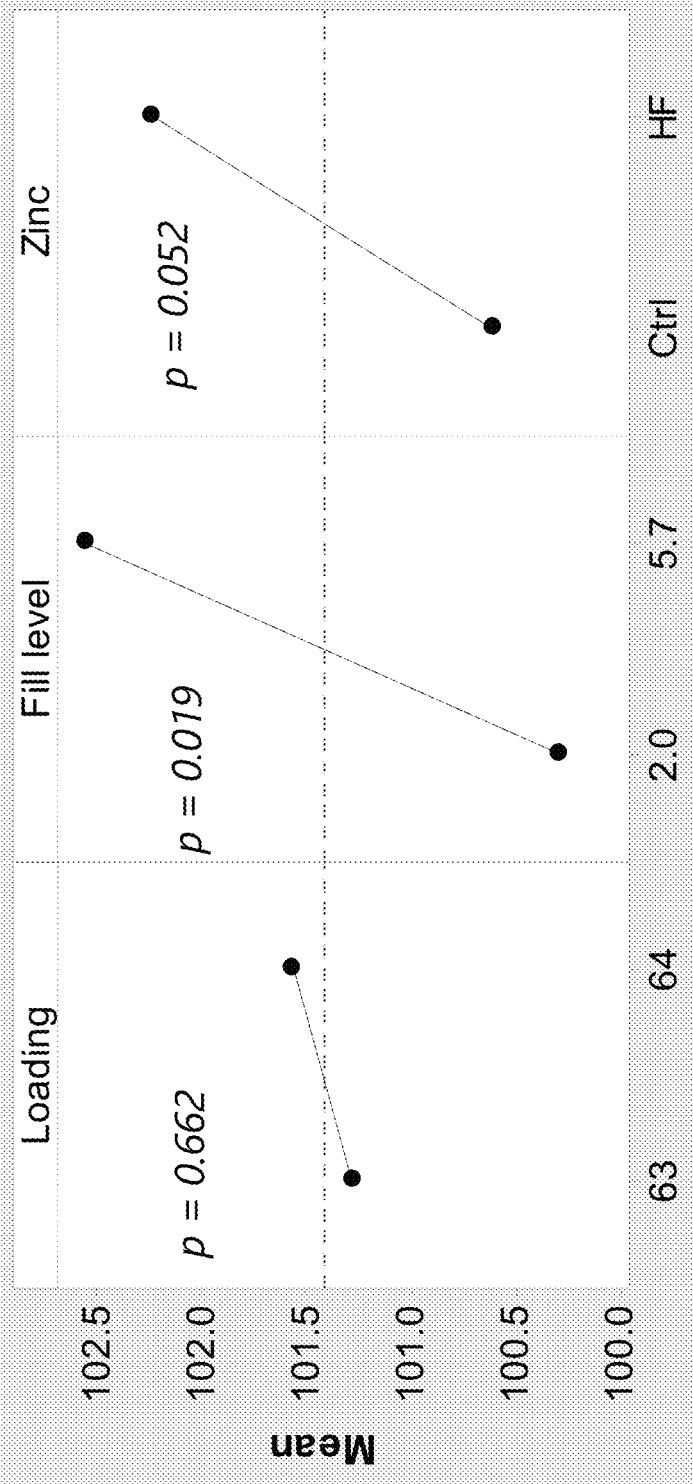
Fig. 10 ANSI average % performance of LR20 cells with IBC separator. Data Means

ALKALINE ELECTROCHEMICAL CELL WITH IMPROVED ANODE AND SEPARATOR COMPONENTS

CROSS REFERENCE TO RELATED APPLICATIONS

This application is a division of U.S. patent application Ser. No. 15/626,601, filed on Jun. 19, 2017, which claims the benefit under 35 U.S.C. § 119(e) of U.S. Provisional Application No. 62/352,243, filed on Jun. 20, 2016, which are incorporated herein by reference in their entirety.

FIELD

The present technology is generally related to the field of zinc anodes for electrochemical cells. In particular, the technology is related to zinc anodes with improved reliability and low zinc loadings.

BACKGROUND

Alkaline cells are generally designed to have a defined zinc content in the anode compartment (zinc loading) which can range from about 65% to about 72%, depending on discharge capacity needs and cost considerations. Increasing the zinc loading above 72% can lead to enhanced cell gassing, and decreasing the zinc loading below 65% can lead to reliability issues. Reduced zinc loading can result in inadequate contact between the zinc particles, as well as between the anode and the corresponding current collector. Thus, low zinc loadings below 65% can lead to cell failures in abuse tests such as drop and vibration discharge tests, among others. New and improved ways to reduce zinc loading and lower the cost of production without adversely affecting the battery performance are needed.

SUMMARY

In one aspect, an alkaline electrochemical cell is provided which includes a cathode, an anode comprising an anode active material, and a non-conductive separator disposed between the cathode and the anode, wherein from about 20% to about 50% by weight of the anode active material relative to a total amount of anode active material has a particle size of less than about 75 µm. The separator includes a unitary, cylinder type configuration having an open end, a side wall, and integrally formed closed end disposed distally to the open end. This type of separator has an integrated bottom cap (IBC) formed as part of the whole separator, unlike conventional separators having a separate cap component at the bottom of the separator.

In some embodiments, the anode active material has an apparent density from about 2.62 g/cc to about 2.92 g/cc. In some embodiments, less than about 20% by weight of the anode active material, relative to the total amount of the anode active material has a particle size of greater than about 150 µm. In some embodiments, the anode active material includes a zinc alloy. In some embodiments, the zinc alloy includes zinc, indium, and bismuth. In other embodiments, the zinc alloy includes about 130 ppm to about 270 ppm of bismuth; and about 130 ppm to about 270 ppm of indium. In some embodiments, the anode includes from about 62% to about 70% by weight of the zinc alloy, relative to the total weight of the anode. In other embodiments, the anode includes about 63% by weight of the zinc alloy, relative to the total weight of the anode.

In one aspect, an anode gel is provided, wherein the gel includes an electrolyte, a gelling agent, a surfactant compound, and an anode active material wherein from about 20% to about 50%, by weight relative to a total weight of anode active material has a particle size of less than about 75 µm.

In some embodiments, about 20% to about 50% by weight of the anode active material, relative to the total amount of anode active material has a particle size of less than about 75 microns, and about 8% to about 20% by weight relative of the total zinc alloy has a particle size of greater than about 150 micrometers.

In yet another aspect, a separator is provided, wherein the separator includes a non-conductive, porous material formed in to a cylinder and having an open end and an integrally formed closed end disposed distally to the open end, wherein the separator has a single layer wound twice and having a dry thickness of about 0.205 mm to about 0.245 mm.

In some embodiments, the porous material is a paper composed of polyvinyl alcohol fiber, rayon fiber, or cellulose. In some embodiments the porous material further includes a surface active agent. In some embodiments, the separator comprises a single coupon of paper wound twice.

In one aspect a method for reducing the gassing of an electrochemical cell subject to gassing is provided, wherein the method includes providing as the active anode of said cell, an anode gel which includes an anode active material, wherein from about 20% to about 50%, by weight relative to a total weight of anode active material has a particle size of less than about 75 µm, an alkaline electrolyte, and a gelling agent.

In another aspect a method for enhancing the discharge performance of an electrochemical cell is provided, wherein the method includes providing as the active anode of said cell, an anode gel which includes an anode active material, wherein from about 20% to about 50%, by weight relative to a total weight of anode active material has a particle size of less than about 75 µm, an alkaline electrolyte, and a gelling agent.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

FIG. 3 is a plot of performance over time of ten LR20 cells that contain 63% loading of standard zinc and an integrated bottom cup separator, according to Example 1.

FIG. 4 is a plot of performance over time of ten LR20 cells that contain 63% loading of high fines (HF) zinc and an integrated bottom cup separator, according to Example 1.

FIG. 5 is a plot of performance over time of ten LR20 cells that contain 64% loading of standard zinc and an integrated bottom cup separator, according to Example 1.

FIG. 6 is a plot of performance over time of ten LR20 cells that contain 64% loading of high fines zinc and an integrated bottom cup separator, according to Example 1.
}

FIG. 7 shows the mean time to failure (MTTF) for LR20 cells that contain an integrated bottom cup separator at different loading, fill level and type of zinc in the anode, according to Example 1.

FIG. 8 shows the percent of initial amperage after drop test for LR20 cells that contain an integrated bottom cup separator, according to Example 1.

FIG. 9 is a graph illustrating gassing characteristics of partially discharged (PD) LR20 cells having an integrated bottom cup separator, according to Example 1.

FIG. 10 illustrates the ANSI performance of LR20 cells containing an integrated bottom cup separator, according to Example 1.

Figure 1:
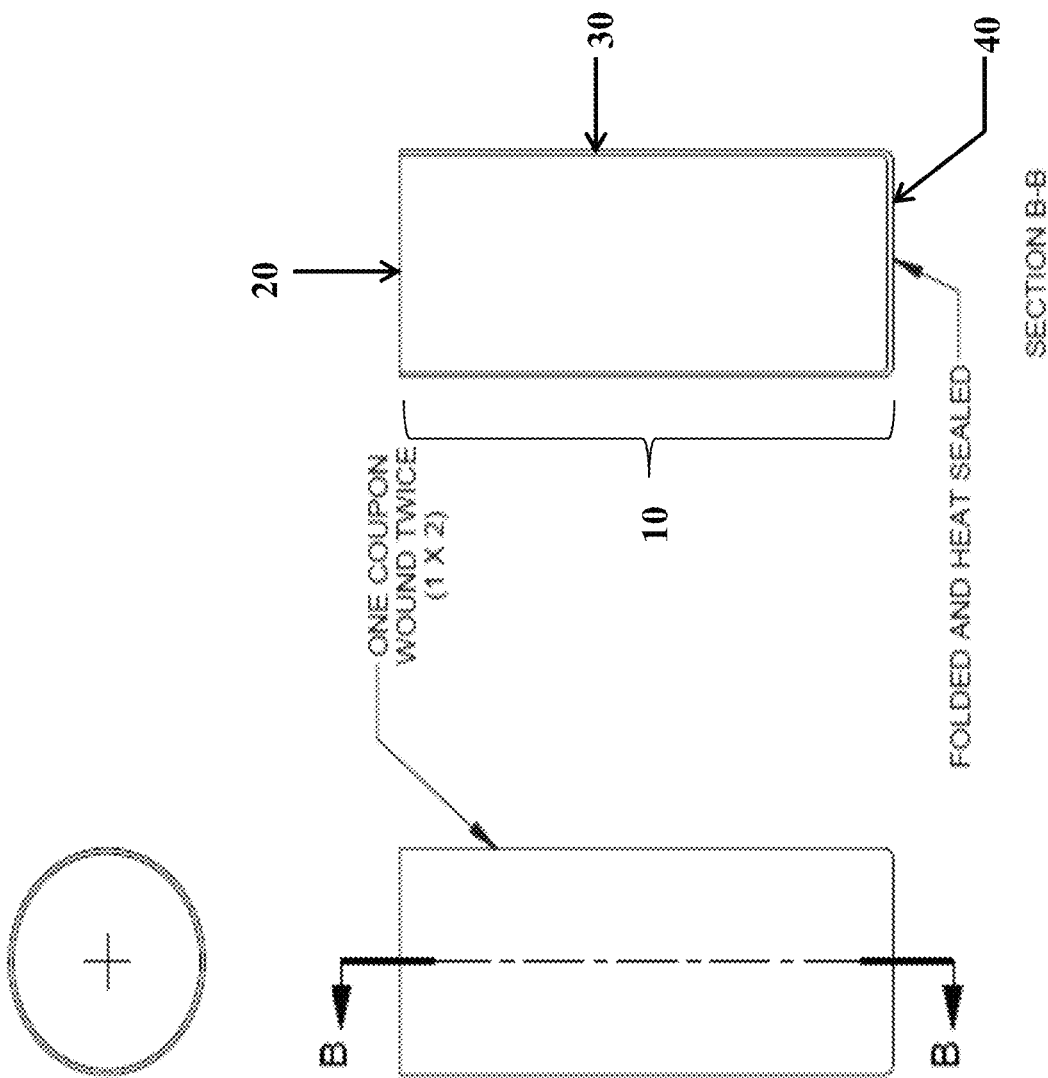
FIG. 1 is a schematic illustration of a top view and a cross-sectional view of the IBC a separator constructed, in accordance with one embodiment.

It is to be further noted that the design or configuration of the components presented in these figures are not scale, and/or are intended for purposes of illustration only. Accordingly, the design or configuration of the components may be other than herein described without departing from the intended scope of the present disclosure. These figures should therefore not be viewed in a limiting sense.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Ratio, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

As used herein, the term "zinc anode" refers to an anode that includes zinc as an anode active material.

As used herein, "fines" are particles passing through a standard 200 mesh screen in a normal sieving operation (i.e., with the sieve shaken by hand). "Dust" consists of particles passing through a standard 325 mesh screen in a normal sieving operation. "Coarse" consists of particles not passing through a standard 100 mesh screen in a normal sieving operation. Mesh sizes and corresponding particle sizes as described here apply to a standard test method for sieve analysis of metal powders which is described in ASTM B214.

As used herein, "aspect ratio" refers to the dimension determined by the ratio between the length of the longest dimension of the particle and the relative width of the particle.

As used herein, "unitary" can mean that all the components described herein are integrally formed as a single unit, and not as separate parts being joined to form a unit.

Alkaline batteries have been improved over the years to enhance their discharge capability as well as to improve their reliability. However, advances in the technology have been accompanied by enhanced cell gassing. Zinc anode gels of alkaline electrochemical cells are prone to electrochemical corrosion reactions when the battery cells are stored in the undischarged or partial discharged condition due to zinc anode corrosion. Optimized particle size distribution of anode active material and improved cell component design which will decrease gassing, improve cell discharge, and control cell reliability are desired.

It has now been found that improvement in the reliability of low cost alkaline cells can be achieved by inclusion of anode active material with a modified particle size distribution in conjunction with a separator integrated with a bottom cup design. Improvements in cell function are achieved by utilizing a zinc powder having an optimized particle size distribution (PSD), characterized here as high fines (HF) zinc, alone or in conjunction with a separator designed with an integrated bottom cup (IBC) separator. The particle size distribution of the zinc anode powder is adjusted with respect to the content of dust (<45 μm), fines (<75 μm), coarse (>150 μm), and large particles (>425 μm). Conventional alkaline cells use zinc powders with a content of zinc fines at or below about 15%, characterized here as STD zinc. In large LR20 cells, the use of STD fines particles at relatively low levels results in reliability failures when the zinc loading is below 65%. It has been found that particle to particle contact is favored by increasing the content of fines above typical standard levels found in conventional battery cells. This is important particularly when using low zinc loadings. Lowering the zinc loading in alkaline cells is beneficial to reduce cost.

Accordingly, in one aspect, an anode gel for an alkaline electrochemical cell is provided, wherein the anode includes an anode active material, wherein from about 20% to about 50%, by weight relative to a total weight of anode active material has a particle size of less than about 75 μm, an electrolyte, a surfactant, and a gelling agent.

The type of the anode active material may generally be selected from those known in the art, in order to optimize performance of the alkaline electrochemical cell of which this gelled anode is a part. In some embodiments, the anode active material comprises zinc, which may be used alone or in combination with one or more other metals. Furthermore, it is typically used in the form of an alloy powder. Thus, in some embodiments the anode active material comprises a zinc alloy.

Typically, alloy materials may include from about 0.01% to about 0.5% by weight of alloy agent alone, or in combination with, from about 0.005% to about 0.2% by weight of a second alloying agent such as bismuth, indium, lithium, calcium, aluminum, and the like. For example, in one or more embodiments one of ordinary skill in the art may readily select a suitable powder comprising zinc mixed with, or alloyed with, one or more other metals known in the art (e.g., In, Bi, Ca, Al, Pb, etc.). Accordingly, in this regard it is to be noted that, as used herein, "anode active material" and/or "zinc" may refer to a particle or powder alone, or one that has been optionally mixed or alloyed with one or more other metals. Anode active material particles may be present in a variety of forms including, for example, elongated, round, as well as fiber-like or flake-like particles.

In some embodiments of the present disclosure, the zinc alloy comprises indium and bismuth. In some embodiments, the zinc alloy includes zinc, bismuth, and indium. In some embodiments, the zinc alloy includes zinc, bismuth, indium, and aluminum. The concentrations of the metals alloyed with zinc may range from about 20 ppm to about 750 ppm. In some embodiments, the alloying metals are present at a concentration of about 50 ppm to 550 ppm. In other embodiments, the alloying metals are present at a concentration of about 130 ppm to 270 ppm. In other embodiments, the alloying metals are present at a concentration of about 150 ppm to 250 ppm. In some embodiments, the zinc alloy includes bismuth and indium as main alloying elements, each at a concentration of about 130 ppm to about 270 ppm. In some embodiments, the zinc alloy includes bismuth and indium as main alloying elements, each at a concentration of about 200 ppm.

The anode active material can be present in the anode in the form of coarse, fines, or dust, for example, or combinations of these forms. The anode active material may have an average particle size of about 70 micrometers to about 175 micrometers. This includes an average particle size of about 75 micrometers, about 80 micrometers, about 85 micrometers, about 90 micrometers, about 100 micrometers, about 110 micrometers, about 120 micrometers, about 130 micrometers, about 140 micrometers, or about 150 micrometers. In some embodiments, the anode active material has an average particle size of about 100 micrometers to about 170 micrometers. In some embodiments, the anode active material includes zinc alloy particles having an average particle size of about 120 micrometers.

Standard anode active materials, such as zinc alloy particles (STD) which are conventionally used in electrochemical cells have a particle size distribution of about 0.5% to about 2.0% dust, about 5% to about 25% fines and about 25% to about 60% coarse particles. The integrated bottom cup separator described herein allows for an increase in the content of fine zinc anode particles, that is particles passing 200 mesh screen size (75 μm), without concurrent increase in cell gassing. Accordingly, in some embodiments, the negative electrode includes high fines (HF) anode active materials whose fines content is higher and coarse content is lower than that of conventional standard zinc powders.

In some embodiments, greater than 15% by weight of the anode active material, relative to the total amount of anode active material present in the anode gel, have a particle size of less than about 75 micrometers. This includes embodiments wherein greater than about 20%, greater than about 25%, greater than about 30% or greater than about 35% by weight of the anode active material, relative to the total amount of anode active material present in the anode gel, have a particle size of less than about 75 micrometers. In some embodiments, about 15% to about 60% by weight of the anode active material, relative to the total amount of anode active material present in the anode gel, have a particle size of less than about 75 micrometers. This includes embodiments wherein about 15% to about 55%, about 20% to about 50%, about 25% to about 45%, or about 35% to about 40%, and ranges between any two of these values or less than any of these values, by weight of the anode active material, relative to the total amount of anode active material present in the anode gel, have a particle size of less than about 75 micrometers. In some embodiments, about 30% by weight of the anode active material, relative to the total amount of anode active material present in the anode gel, have a particle size of less than about 75 micrometers. In some embodiments, about 40% by weight of the anode active material, relative to the total amount of anode active material present in the anode gel, have a particle size of less than about 75 micrometers. In some embodiments, about 20% to about 50% by weight of the anode active material, relative to the total amount of anode active material present in the anode gel, have a particle size of less than about 75 micrometers.

In some embodiments less than about 35% by weight of the anode active material relative to the total amount of anode active material present in the anode gel has a particle size of greater than about 150 micrometers. This includes embodiments wherein less than about 30%, less than about 25%, less than about 20% or less than about 15% by weight of the anode active material, relative to the total amount of anode active material present in the anode gel, have a particle size of greater than about 150 micrometers. In some embodiments less than about 20% by weight of the anode active material relative to the total amount of anode active material present in the anode gel has a particle size of greater than about 150 micrometers.

In some embodiments, about 1% to about 25% by weight of the anode active material relative to the total amount of anode active material present in the anode gel, have a particle size of less than about 45 micrometers. This includes embodiments wherein about 1% to about 20%, about 2% to about 15%, or about 5% to about 10%, and ranges between any two of these values or less than any of these values, by weight of the anode active material, relative to the total amount of anode active material present in the anode gel, have a particle size of less than about 45 micrometers. In some embodiments, about 2% to about 10% by weight of the anode active material relative to the total amount of anode active material present in the anode gel, have a particle size of less than about 45 micrometers.

A suitable zinc particle size distribution may be one in which at least 70% of the particles have a standard mesh-sieved particle size within a 100 micron size range and in which the mode of the distribution is between about 100 and about 300 microns. In one embodiment, a suitable zinc particle size distribution include particle size distributions meeting the above-noted tests and having a mode of 75 microns, 100 microns, 150 microns, or 200 microns, each plus or minus about 10%. In one embodiment, about 70% of the particles are distributed in a size distribution range narrower than about 100 microns, for example about 75 microns, about 50 microns, or about 40 microns, or less.

The anode gels of the present disclosure may include a zinc loading lower than the loading in conventional cells. For example, the anode gels may have a zinc loading of about 70% w/w or less, relative to the weight of the anode gel. In some embodiments, the anode gel may have a zinc loading of about 68% w/w or less, about 65% w/w or less, about 64% w/w or less, or about 63% w/w or less, relative to the weight of the anode gel. In some embodiments, the anode gel may have a zinc loading of about 64% w/w, relative to the weight of the anode gel. In other embodiments, the anode gel may have a zinc loading of about 63% w/w, relative to the weight of the anode gel.

The anode gel materials have a suitable viscosity required to provide the enhanced cell discharge performance. For example, the viscosity may be from about 30,000 cps to about 200,000 cps, at about 25° C.

The anode gel of the present disclosure includes an alkaline electrolyte, and in some embodiments an alkaline electrolyte having a relatively low hydroxide content. Suitable alkaline electrolytes include, for example, aqueous solutions of potassium hydroxide, sodium hydroxide, lithium hydroxide, as well as combinations thereof. In one particular embodiment, however, a potassium hydroxide-containing electrolyte is used. In other embodiments, the alkaline electrolyte includes water and potassium hydroxide.

The electrolytes utilized in accordance with the present disclosure typically have a hydroxide (e.g., potassium hydroxide) concentration of about 35%, about 30% or less (e.g., about 29%, about 28%, about 27%, about 26%, or even about 25%), based on the total electrolyte weight. However, typically the electrolyte has a hydroxide concentration of between about 25% and about 35%, or between about 26% and about 30%. In one particular embodiment (e.g., a anode gel suitable for use in a cell sized and shaped as, for example, an AA or AAA cell), the hydroxide concentration of the electrolyte is about 28% by weight, based on the total weight of the electrolyte.

In some embodiments, the hydroxide electrolyte content in the anode gel is generally at or near that of conventional gelled anodes, the concentration for example is at least about 24% by weight, at least about 26% by weight, or at least about 28% by weight, and less than about 34% by weight, less than about 32% by weight, or less than about 30% by weight, based on the total weight of the gelled anode. The concentration of the electrolyte in the anode gel of the present disclosure may, therefore, typically be within the range of from about 24% by weight to about 34% by weight, from about 26% by weight to about 32% by weight, or from about 28% by weight to about 31% by weight, based on the total weight of the anode gel. The desired concentration of electrolyte in the anode gel generally depends on a variety of factors including, for example, the concentration of zinc in the gelled anode.

The gelling agent is present in the anode, at least in part, to add mechanical structure and/or to coat the metallic particles to improve ionic conductivity within the anode during discharge. Suitable gelling agents are those that impart a rigid-type gel structure and a slightly decreased packing density to the gelled anode within the cell, as well as a corresponding greater but more stable anode particle-to-particle distance. The anode may be prepared by formulating an electrolyte, preparing a coated metal anode which includes the gelling agent, and then combining the electrolyte and the coated metal anode to form a anode gel. The gelling agent of the present disclosure may include, for example, a highly cross-linked, polymeric chemical compound that has negatively charged acid groups, such as a polyacrylic acid gelling agent having a high degree of crosslinking.). Highly crosslinked polyacrylic acid gelling agents, commercially available under the name Carbopol™ (Carbopol 940, Carbopol 934, Carbopol 674) from Lubrizol Corporation (Wickliffe, Ohio) as well as Flogel™ (e.g., Flogel™ 700 or 800) from SNF Holding Company (Riceboro, Ga.), among others, are suitable for use in accordance with the present disclosure.

Suitable gelling agents may be selected based on various characteristics such as the degree of crosslinking, the viscosity and/or density. The concentration of the gelling agent in the anode gel may be optimized for a given use. For example, the concentration of the gelling agent is at least about 0.30 weight %, based on the total weight of the anode gel, including at least about 0.40 weight %, at least about 0.50 weight %, at least about 0.60 weight %, at least about 0.625 weight %, at least about 0.65 weight %, at least about 0.675 weight %, at least about 0.7 weight % or more. For example, in various embodiments the concentration of the gelling agent in the gelled anode may be from about 0.40% to about 0.75%, or between about 0.50% and 0.75%, or between about 0.6% and about 0.7%, or between about 0.625% and about 0.675%, by weight of the anode gel.

The anode gel may include other components or additives, in addition to the anode active material, the gelling agent and the electrolyte. Such additives include, for example, absorbents, corrosion inhibitors or gassing inhibitor etc. Suitable absorbent materials may be selected from those generally known in the art. Exemplary absorbent materials include those sold under the trade name Salsorb™ or Alcasorb™ (e.g., Alcasorb™ CL15), which are commercially available from Ciba Specialty (Carol Stream, Ill.), or alternatively those sold under the trade name Sunfresh™ (e.g., Sunfresh DK200VB), commercially available from Sanyo Chemical Industries (Japan). Suitable gassing inhibitors include organic phosphate esters, for example, RHODAFAC® RM-510 and RHODAFAC® RS-610, which are commercially available from Rhodia (Boston, Mass.).

It has been surprisingly found by the present disclosure that high fines anode active material particles improve packing, enhance particle-to-particle contact, and increase active anode reaction sites that are necessary for high drain capability.

Accordingly, in some embodiments of the present disclosure, the anode active material has an apparent density below about 3.00 g/cc. In other embodiments, the anode active material has an apparent density of from about 2.55 g/cc to about 2.99 g/cc, in some embodiments from about 2.60 g/cc to about 2.95 g/cc, in some embodiments about 2.62 g/cc to about 2.95 g/cc, in some embodiments about 2.65 g/cc to about 2.90 g/cc, and in some embodiments about 2.70 g/cc to about 2.85 g/cc. In yet other embodiments, the anode active material has an apparent density of about 2.71 g/cc; in some embodiments about 2.83 g/cc; and in some embodiments about 2.94 g/cc. In still other embodiments, the anode active material has an average apparent density of about 2.70 g/cc; in other embodiments an average apparent density of about 2.80 g/cc; and in yet other embodiments an average apparent density of about 2.95 g/cc.

The technology provides an anode gel having yield stress of greater than about 150 cps. This includes yield stress of from about 150 to about 950, and ranges between any two of these values or less than any one of these values. In some embodiments, the anode gel has a yield stress value of about 250 $N/m^2$ to about 850 cps.

The anode gel of the disclosed embodiments may be included as a component in a conventional electrochemical cell such as batteries. These include, for example, alkaline cylindrical cells, e.g., zinc-metal oxide cell, as well as galvanic cells, such as in metal-air cells, e.g., zinc-air cell.

Among the cylindrical metal-metal oxide cells and metal-air cells, the anode material is applicable to those shaped for AA, AAA, AAAA, C, or D cells. Metal-air cells which include the anode described herein may usefully be constructed as button cells for the various applications such as hearing aid batteries, and in watches, clocks, timers, calculators, laser pointers, toys, and other novelties. Also, the anode may find application in any metal air cell using flat, bent, or cylindrical electrodes. Use of the anode material as components in other forms of electrochemical cells is also contemplated.

Accordingly, in one aspect, provided is an alkaline electrochemical cell which includes a cathode, an anode which includes an anode active material, and a non-conductive separator disposed between the cathode and the anode. In some embodiments of the electrochemical cell, about 20% to about 50% by weight of the anode active material relative to a total amount of anode active material has a particle size of less than about 75 µm. In some embodiments of the electrochemical cell, the separator includes a unitary, cylinder type configuration having an open end, a side wall, and integrally formed closed end disposed distally to the open end.

Figure 2:
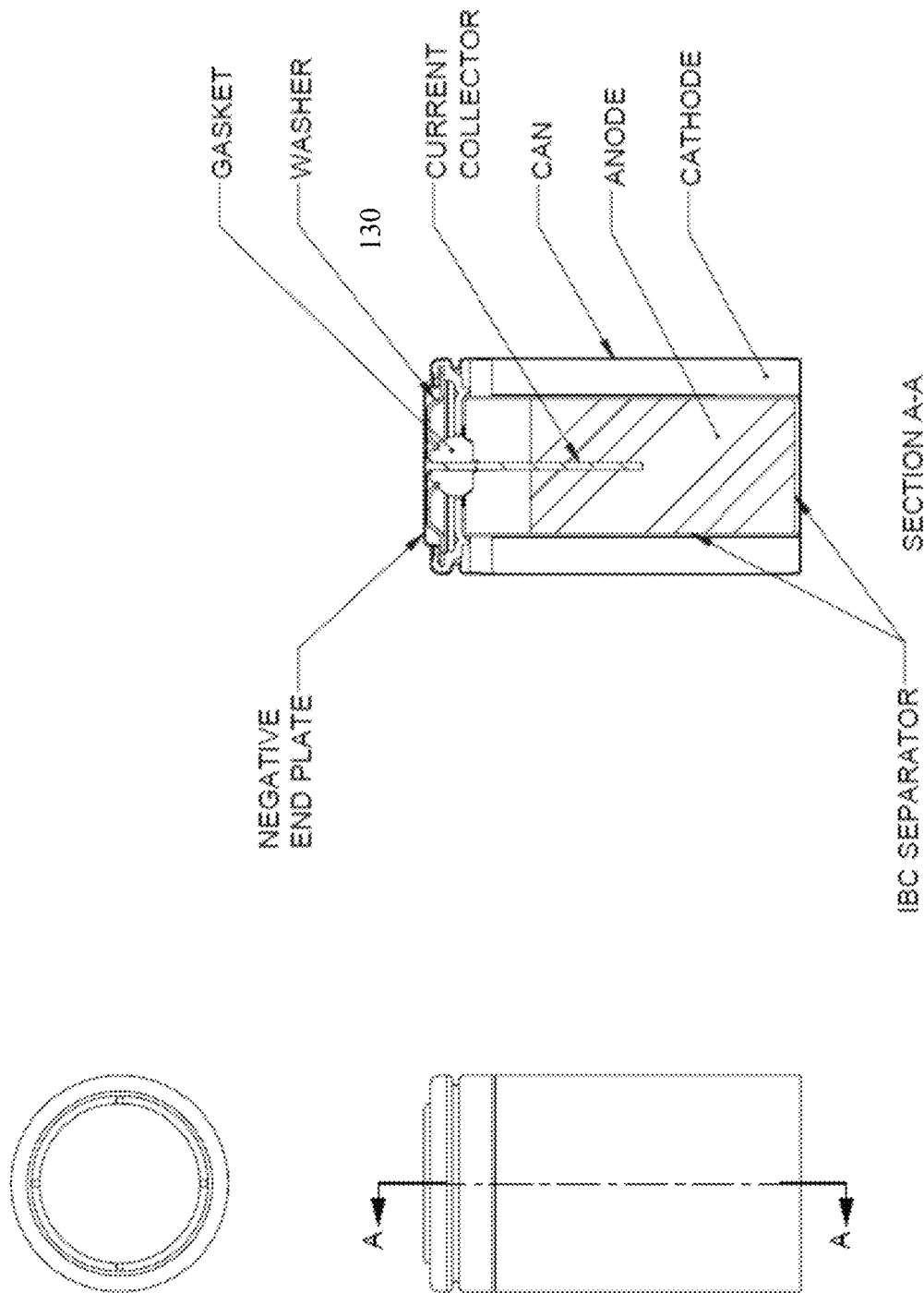
FIG. 2 is a schematic illustration of an electrochemical cell incorporating an IBC separator constructed, in accordance with one embodiment.

An exemplary embodiment of an alkaline electrochemical cell is illustrated in FIG. 2, although other designs should not be so limited. Referring initially to FIG. 2, the electrochemical cell comprise a centrally disposed anode (i.e., a negative electrode) surrounded by an elongate annular cathode (i.e., a positive electrode). The anode and cathode are disposed in close, but physically spaced relation with each other within a metal container (which serves as a positive current collector) having an open top end. A tubular separator (also sometimes referred to as an anode container) is formed as a cup to hold the anode material and physically separates the anode and cathode within the metal container.

Electrical connection to the anode is achieved by inserting an elongate metal rod or wire, commonly referred to as a negative current collector, into the anode. A top end of the current collector protrudes above the gasket for physical and electrical connection to an electrically conductive negative terminal plate, while the primary length of the collector below the gasket is inserted into the anode material. The gasket seals the collector at the gasket hub, through which the collector extends, to inhibit anode material from passing out through the gasket.

In a conventional electrochemical cell, the separator extends from the bottom of the metal container to a terminal end extending slightly outward from between the anode and the cathode, particularly prior to the cell being closed. Upon closing the cell, the gasket contacts and pushes down against the terminal end of the separator, often causing the terminal end of the separator to generally fold or bend so that one side of the terminal end of the separator generally faces and abuts against the gasket to inhibit electrolyte or particulate material (e.g., the electrode materials) against leaking or being carried over the terminal end of the separator between the anode and cathode compartments. Further the thick separator takes up space within the cell and thus compromises the quantity of active materials that can be incorporated in the cell. As long as adequate electrolyte is available in the cell, the quantity of active materials and the efficiency of their discharge determine the service life of the cell. The IBC Separator described herein reduces the volume occupied by the separator, e.g., by decreasing the separator wall thickness and reduces cost by eliminating the use of the bottom disk.

The electrochemical cell may be prepared by any means known in the art, so long as the resulting cell does not conflict with the disclosures presented herein. Thus, the present disclosure includes a method of preparing a electrochemical cell including the components and their respective concentrations as discussed throughout the entirety of this disclosure.

The anode for the electrochemical cell is as described hereinabove. The cathode of the electrochemical cell may include any cathode active material generally recognized in the art for use in alkaline electrochemical cells. The cathode active material may be amorphous or crystalline, or a mixture of amorphous and crystalline. For example, the cathode active material may include, or be selected from, an oxide of copper, an oxide of manganese as electrolytic, chemical, or natural type (e.g., EMD, CMD, NMD, or a mixture of any two or more thereof), an oxide of silver, and/or an oxide or hydroxide of nickel, as well as a mixture of two or more of these oxides or hydroxide. Suitable examples of positive electrode materials include, but are not limited to, $MnO_2$ (EMD, CMD, NMD, and mixtures thereof), NiO, NiOOH, $Cu(OH)_2$, cobalt oxide, $PbO_2$, AgO, $Ag_2O$, $Ag_2Cu_2O_3$, $CuAgO_2$, $CuMnO_2$, $Cu\ Mn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$, or a combination of any two or more thereof.

The electrochemical cell may include a separator between the cathode and the zinc anode, which is designed for preventing short-circuiting between the two electrodes. Generally, any separator material and/or configuration suitable for use in an alkaline electrochemical cell, and with the cathode and/or anode materials set forth herein above, may be used in accordance with the present disclosure. In one embodiment, the electrochemical cell includes an integrated bottom cup separator system that is disposed between a gelled anode of the type described here and a cathode.

In one aspect, provided is a separator for an electrochemical cell, wherein the separator includes a non-conductive, porous material formed in to a cylinder and having an open end and an integrally formed closed end disposed distally to the open end.

As described above, in conventional separators, one end of the separator has a bottom disk folded to form a cup shaped separator which extends in to the bottom of the cell cavity holding the anode gel and insulating it from the metal battery container as well as from the cathode. This configuration generally requires multiple coupons of separator material having multiple wraps, for example 2 coupons having 2 wraps (2×2). The separator of the present disclosure is designed to the have an integrated bottom cup (IBC), which when used in electrochemical cells, especially in large cells such as LR20, provides benefits such as cost reduction by eliminating the use of the bottom disk, containment of the anode gel within the separator unit to improve reliability, and reduction in paper volume from multiple coupons having multiple wraps (e.g., 2×2) to a single coupon having one or more wraps (e.g., 1×2), thus increasing internal anode volume. The anode and separator design enhancements were found to result in improved properties such as for reduced cost and reliability.

Referring to FIG. 1, in an exemplary embodiment for an IBC separator for LR20 cells, the separator 10 includes a unitary, cylindrical body having an open end 20, a side wall 30, and integrally formed closed end 40 disposed distally to the open end. The separator is prepared by winding a single coupon of separator material, such as paper, once or twice around a mandrel, and having multiple pleats formed and folded inward on one end to form a flat closed end. The closed end is permanently bonded together using suitable sealing methods such as by utilizing atomized water, heat, and/or pressure. Typically, the separator 10 is formed and assembled into an electrochemical cell during the cell assembly without the use of glue or other adhesives. However, adhesives and/or sealants could be applied to the separator, if required.

The separator may be made of any suitable alkaline resistant, non-conductive synthetic or natural, woven or non-woven porous material, including, but not limited to, polymer materials, Tencel® (lyocell), mercerized wood pulp, polypropylene, polyethylene, cellophane, cellulose, methylcellulose, rayon, nylon and combinations thereof. In some embodiments, the separator is composed of a porous material which includes a paper composed of one or more polymeric fibers. In some embodiments, the separator a porous material which includes one or more polymer fibers with an effective amount of a surface active agent embedded therein. Suitable polymer materials for the polymeric fiber include, but are not limited to, polyvinyl alcohol, polyamides, polyethylene terephthalate, polypropylene terephthalate, polybutylene terephthalate, polyvinylidene fluoride, polyacrylonitrile, polypropylene, polyethylene, polyurethane and blends, mixtures and copolymers thereof such as rayon, nylon, and the like and combinations thereof.

In some embodiments, the porous material includes paper. In some embodiments, the porous material includes a paper which includes polyvinyl alcohol fiber, rayon fiber, cellulose, or a combination of two or more thereof, and can have a surface active agent.

The active surface agent can include, but are not limited to ionic surfactants and nonionic surfactants. The amount of the surface active agent can vary from about 0.2 wt % to about 1.0 wt % relative to the polymer material.

In some embodiments, the IBC separator may be designed to include a single layer of the non-conductive porous material sheet wound twice. The IBC separator may have a thickness, when measured in the dry state (dry thickness) of less than about 0.3 mm, this includes a dry thickness of less than about 0.29 mm, less than about 0.28 mm, less than about 0.27 mm, less than about 0.26 mm, or less than about 0.25 mm. In some embodiments, the IBC separator has thickness in a dry state of about 0.15 mm to about 0.26 mm, which includes about 0.18 mm to about 0.25 mm, about 0.205 mm to about 0.245 mm, about 0.210 mm to about 0.240 mm, or about 0.215 mm to about 0.235 mm, and ranges between any two of these values or less than any one of these values. In some embodiments, the IBC separator has thickness in a dry state of about 0.205 mm to about 0.245 mm, when measured using a micrometer instrument according to ISO Standard 534 at a pressure of 100 kPa and 20 kPa.

The anode and separator design embodiments detailed in the present disclosure allows reducing the zinc loading in alkaline cells to as low as 63%, or lower, by adjusting the zinc particle size distribution to specified levels of dust, fines, coarse, and large particles. Drop and discharge vibration failures in large cells can be suppressed by controlling the level of fines particles to be above about 20% by weight. Cell gassing, such as after partial battery discharge, is impacted by the content of zinc fines particles. The anticipated high cell gassing from the enlarged surface area with increased levels of fines is suppressed by controlling the level of coarse particles. The mechanisms leading to gas suppression in an alkaline cell having relatively high content of fines is based on minimizing the adverse impact of metallic impurities within the battery by controlling the content of coarse zinc particles.

Reliability failures at relatively low zinc loadings are thought to be the result of insufficient particle-to-particle contact between the zinc particles which leads to low amperage, voltage dips, and failures during discharge vibration. Particle-to-particle contact can be improved by increasing the content of zinc fine particles in the anode battery electrode, as disclosed here. The zinc anode powder with increased levels of fines can be contained in a separator whose design has a bottom cup integrated in the battery separator as a whole. The use of IBC separator with conventional zinc powder material in battery cells, such as LR20 cells, at low zinc loadings, such as below 65%, results in battery failures during abuse testing. However, by using an HF zinc type powder in conjunction with IBC separator in LR20 cells the battery cost can be reduced and its reliability issues eliminated, as described in the examples below.

As further detailed elsewhere herein, the electrochemical cells of the present disclosure have been observed to exhibit improved performance characteristics, which may be measured or tested in accordance with several methods under the American National Standards Institute (ANSI). Results of various tests of cells of the present disclosure are detailed below in the Examples.

The following Examples describe various embodiments of the present disclosure. Other embodiments within the scope of the appended claims will be apparent to a skilled artisan considering the specification or practice of the disclosure provided herein. It is therefore intended that the specification, together with the Examples, be considered exemplary only, with the scope and spirit of the disclosure being indicated by the claims, which follow the Examples.

EXAMPLES

In the Examples presented below, electrochemical cells of the present disclosure were tested for DSC performance, drop test amperage (both before and after the drop), partial discharge gassing and conditions after storage.

Example 1—Performance of Electrochemical Cells with Anode Containing HF Zinc and IBC Separator In the Examples presented below, electrochemical cells were tested for DSC performance, partial discharge cell gassing, undischarged cell gassing, and conditions after storage. Gelled anodes were prepared in accordance with the improvements of the present disclosure.

Gel viscosity is measured using Brookfield digital viscometer and teflon-coated spindle #06 at 4 rpm. When measuring, allow the reading to stabilize over 5 minutes before recording the viscosity value.

For yield stress value measurement, measuring the gel viscosity values at 1.0 rpm (R1) and 0.5 rpm (R2) respectively, the yield stress value is calculated using the formula: yield stress value=(R2−R1)/100.

FIG. 3 shows the discharge vibration of LR20 battery cells made with standard bismuth-indium zinc alloy powder (STD) of apparent density at 3.0 g/cc and containing 12% of zinc fines particles (<75 µm), 45% of coarse particles (>150 µm), and at a zinc loading of 63%. The anode gels of the LR20 cells had a gel KOH concentration at 32% and the zinc powder had bismuth and indium as main alloying elements at a concentration of about 150 ppm and 150 ppm, respectively. The discharge vibration test is done applying to each battery a continuous discharge resistance load of 1.5 ohms while the batteries are kept in place in a vibration table applying a simple harmonic motion with an amplitude of 0.75 mm at a frequency of 10 Hz which is increased to a maximum of 40 Hz at a rate of 1 Hz per minute. The discharge cycle is completed over a period of 30 minutes. FIG. 4 displays the discharge vibration data of a similar cell as described in FIG. 3 with a zinc loading at 63%, except that the bismuth-indium zinc alloy powder has an apparent density at 2.80 g/cc and contains 40% of fines particles and 11% of coarse particles, referred here as an HF type zinc powder. FIG. 4 shows that discharge vibration failures, defined by the drop in cell voltage (OCV) below 1 V after 30 min of discharge, is eliminated when HF zinc is used.

FIG. 5 shows the discharge vibration of LR20 battery cells containing standard bismuth-indium zinc alloy powder (STD) as described in FIG. 3, except that the zinc loading is 64%. FIG. 6 shows the discharge vibration of LR20 battery cells as described in FIG. 5, except that the anode zinc is HF zinc at the loading of 64%. It is seen the failures with STD zinc persists at 64%, but it is eliminated with HF zinc at this zinc loading.

In addition to type of zinc based on particle size distribution, others factors impacting cell failure due to discharge vibration are zinc loading and anode gel fill, as shown in FIG. 7. This figure shows the mean time to failure during discharge vibration as affected by zinc loading, anode gel fill, and type of zinc powder. The respective p values for each of the tested factors is below 0.050 and indicate that discharge failures are suppressed by increasing zinc loading, increasing gel fill, and particularly by using HF type zinc. The lower the p value below 0.05, the greater the statistical significance of the tested factor. Another beneficial effect of using HF type powder is suppression in drop test failures. The drop test consist in recording the short circuit current (Flash Amps) and open circuit voltage (OCV) before rolling each battery of a flat surface five times consecutively from a height of 102 cm onto a vinyl covered floor. After letting the battery to rest for one hour, the final Flash Amp and OCV values are recorded. For LR20 cells, to pass the drop test, the minimum % of initial Amps is 50%.

FIG. 8 shows the drop test data of LR20 cells made with IBC separators and indicates that cells having HF zinc pass the test, unlike the case of cells made using conventional STD zinc. Cell gassing after partial discharge of the referred LR20 cells having HF or STD zinc at 63% and 64% with anode fill gels at 2% and 5.7% is shown in FIG. 9. No adverse gassing impact with the use of HF zinc is seen. Also, performance is not adversely impacted with the use of HF zinc, as shown in FIG. 10.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A separator for use in an electrochemical cell, said separator comprising:
   a non-conductive, porous material formed into a cylinder and having an open end and an integrally formed closed end disposed distally to the open end, said closed end comprising multiple pleats folded inward;
   wherein:
      the separator has a single layer wound twice and has a dry thickness of about 0.205 mm to about 0.245 mm.

2. The separator of claim 1, wherein the porous material is a paper composed of polyvinyl alcohol fiber, rayon fiber, or cellulose, and comprises a surface active agent.

3. The separator of claim 2, wherein the separator comprises a single coupon of paper wound twice.

4. The separator of claim 2, wherein the surface active agent is an ionic surfactant.

5. The separator of claim 2, wherein the surface active agent is a non-ionic surfactant.

6. The separator of claim 1, wherein the porous material comprises lyocell or mercerized wood pulp.

7. The separator of claim 1, wherein the porous material comprises cellophane.

8. The separator of claim 1, wherein the porous material comprises one or more polymeric fibers.

9. The separator of claim 8, wherein the polymeric fiber comprises a material selected from the group consisting of polyamides, polyethylene terephthalate, polypropylene terephthalate, polybutylene terephthalate, polyvinylidene fluoride, polyacrylonitrile, polypropylene, polyethylene, polyurethane, and blends, mixtures, and copolymers thereof.

10. The separator of claim 1, wherein the separator has a dry thickness of about 0.215 mm to about 0.235 mm.

11. A separator for use in an electrochemical cell, said separator comprising:
   a non-conductive, porous material formed into a cylinder and having an open end and an integrally formed closed end disposed distally to the open end, said closed end comprising multiple pleats folded inward;
   wherein:
      the porous material is made of polymeric fibers; and
      the separator has a single layer wound twice and has a dry thickness of about 0.15 mm to about 0.3 mm.

12. The separator of claim 11, wherein the porous material comprises a surface active agent.

13. The separator of claim 12, wherein the separator comprises a single coupon of paper wound twice.

14. The separator of claim 11, wherein the polymeric fiber comprises a material selected from the group consisting of polyamides, polyethylene terephthalate, polypropylene terephthalate, polybutylene terephthalate, polyvinylidene fluoride, polyacrylonitrile, polypropylene, polyethylene, polyurethane, and blends, mixtures, and copolymers thereof.

15. The separator of claim 14, wherein the polymeric fiber comprises rayon or nylon.

16. A separator for use in an electrochemical cell, said separator comprising:
   a non-conductive, porous material formed into a cylinder and having an open end and an integrally formed closed end disposed distally to the open end, said closed end comprising multiple pleats folded inward;
   wherein:
      the porous material comprises a surface active agent; and
      the separator has a single layer wound twice and has a dry thickness of about 0.15 mm to about 0.3 mm.

17. The separator of claim 16, wherein the surface active agent is an ionic surfactant.

18. The separator of claim 16, wherein the surface active agent is a non-ionic surfactant.

19. The separator of claim 16, wherein the separator is made of synthetic material.

20. The separator of claim 16, wherein the separator is made of natural material.

* * * * *